United States Patent
Nandwana et al.

(10) Patent No.: US 12,027,177 B2
(45) Date of Patent: Jul. 2, 2024

(54) ARTIFICIAL LATENCY FOR MODERATING VOICE COMMUNICATION

(71) Applicant: Roblox Corporation, San Mateo, CA (US)

(72) Inventors: Mahesh Kumar Nandwana, Sunnyvale, CA (US); Philippe Clavel, Belmont, CA (US); Morgan McGuire, Waterloo (CA)

(73) Assignee: Roblox Corporation, San Mateo, CA (US)

( * ) Notice: Subject to any disclaimer, the term of this patent is extended or adjusted under 35 U.S.C. 154(b) by 49 days.

(21) Appl. No.: 17/940,749

(22) Filed: Sep. 8, 2022

(65) Prior Publication Data

US 2024/0087596 A1 Mar. 14, 2024

(51) Int. Cl.
| | | |
|---|---|---|
| *G10L 25/57* | (2013.01) | |
| *G06V 20/40* | (2022.01) | |
| *G10L 21/043* | (2013.01) | |
| *G10L 25/63* | (2013.01) | |
| *H04N 21/454* | (2011.01) | |

(52) U.S. Cl.
CPC .............. *G10L 25/57* (2013.01); *G06V 20/41* (2022.01); *G10L 21/043* (2013.01); *G10L 25/63* (2013.01); *H04N 21/4542* (2013.01)

(58) Field of Classification Search
CPC ....... G10L 25/57; G10L 21/043; G10L 25/63; G06V 20/41; H04N 21/4542
See application file for complete search history.

(56) References Cited

U.S. PATENT DOCUMENTS

| | | | | |
|---|---|---|---|---|
| 11,664,043 B2* | 5/2023 | Lyu | ........................ | G06Q 50/30 704/200 |
| 2010/0280828 A1* | 11/2010 | Fein | ..................... | G10L 15/1822 704/E15.005 |
| 2011/0161999 A1 | 6/2011 | Klappert et al. | | |
| 2019/0158448 A1* | 5/2019 | Anders | ................. | H04L 67/306 |

(Continued)

OTHER PUBLICATIONS

"EmotionalTrac", Retrieved from Internet: https://creative.emotiontrac.com/, 12 pages, 2022.

(Continued)

*Primary Examiner* — Brian L Albertalli
(74) *Attorney, Agent, or Firm* — IP Spring (57) ABSTRACT

A computer-implemented method to determine whether to introduce latency into an audio stream from a particular speaker includes an audio stream from a sender device. The method further includes providing, as input to a trained machine-learning model, the audio stream and a speech analysis score, information about one or more voice emotion parameters, and one or more voice emotion scores for a first user associated with the sender device, wherein the trained machine-learning model is iteratively applied to the audio stream and wherein each iteration corresponds to a respective portion of the audio stream. The method further includes generating as output, with the trained machine-learning model, a level of toxicity in the audio stream. The method further includes transmitting the audio stream to a recipient device, wherein the transmitting is performed to introduce a time delay in the audio stream based on the level of toxicity.

20 Claims, 6 Drawing Sheets

(56) References Cited

U.S. PATENT DOCUMENTS

| | | | |
|---|---|---|---|
| 2020/0090681 A1* | 3/2020 | Hu | A61B 5/4803 |
| 2022/0059071 A1* | 2/2022 | Pearce | H04N 21/4788 |
| 2022/0115033 A1 | 4/2022 | Huffman et al. | |
| 2022/0277505 A1 | 9/2022 | Baszucki et al. | |
| 2022/0293122 A1* | 9/2022 | Shah | H04M 3/2281 |
| 2023/0245650 A1* | 8/2023 | Cary | G10L 25/54 |
| | | | 704/9 |
| 2023/0321546 A1* | 10/2023 | Huffman | A63F 13/795 |
| | | | 704/257 |
| 2023/0353606 A1* | 11/2023 | DiPaulo | G06V 20/40 |
| 2023/0396457 A1* | 12/2023 | Huffman | G06F 3/0484 |

OTHER PUBLICATIONS

"Hive Moderation", Retrieved from Internet: https://hivemoderation.com/, 2022, 5 pages.

Beckhelling, "New tech allows AI to detect toxicity in voice chat, but I think humans might be too smart for it", Retrieved from Internet: https://www.rockpapershotgun.com/new-tech-allows-ai-to-detect-toxicity-in-voice-chat-but-i-think-humans-might-be-too-smart-for-it, Dec. 18, 2020, 5 pages.

Ghosh, et al., "Speech toxicity analysis: A new spoken language processing task", arXiv preprint arXiv:2110.07592, 5 pages, 2021.

Goode, et al., "Measuring and Injecting Latency in Web Apps", Jun. 2009, 15 pages.

Lech, et al., "Real-Time Speech Emotion Recognition Using a Pre-trained Image Classification Network: Effects of Bandwidth Reduction and Companding", Frontiers in Computer Science 2, 2020, 14 pages.

Pepino, et al., "Emotion Recognition from Speech Using wav2vec 2.0 Embeddings", Proc. Interspeech 2021, 2021, pp. 3400-3404.

Takahashi, "Modulate's ToxMod uses AI to scan game voice chat for toxic speech", Retrieved from Internet: https://venturebeat.com/business/modulates-toxmod-uses-ai-to-scan-game-voice-chat-for-toxic-speech/, Dec. 14, 2020.

Williams, et al., "DNN multimodal fusion techniques for predicting video sentiment", In Proceedings of grand challenge and workshop on human multimodal language (Challenge-HML), 2018, pp. 64-72.

Aggarwal, Apeksha et al., "Two-Way Feature Extraction Using Sequential and Multimodal Approach for Hateful Meme Classification", Complexity, vol. 2021, Article ID 5510253, 2021, 7 pages.

USPTO, International Search Report for International Patent Application No. PCT/US2023/032085, dated Dec. 8, 2023, 2 pages.

USPTO, Written Opinion for International Patent Application No. PCT/US2023/032085, dated Dec. 8, 2023, 7 pages.

* cited by examiner

ARTIFICIAL LATENCY FOR MODERATING VOICE COMMUNICATION

BACKGROUND

Online platforms need a way to provide a safe and civil environment in communications between user devices. Text communications are easier to moderate than audio communications because users are more tolerant of delays in transmitting text messages. In addition, moderating text communications is easier than audio streams because text can be compared to a list of prohibited or problematic words. Conversely, moderation of audio streams is more difficult to analyze because of the variation in accents, tone, volume, the use of sarcasm, etc.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a system and method to introduce an artificial latency into audio streams for moderation. According to one aspect, a computer-implemented method includes receiving an audio stream from a sender device. The method further includes providing, as input to a trained machine-learning model, the audio stream and a speech analysis score, information about one or more voice emotion parameters, and one or more voice emotion scores for a first user associated with the sender device, where the trained machine-learning model is iteratively applied to the audio stream and where each iteration corresponds to a respective portion of the audio stream. The method further includes generating as output, with the trained machine-learning model, a level of toxicity in the audio stream. The method further includes transmitting the audio stream to a recipient device, where the transmitting is performed to introduce a time delay in the audio stream based on the level of toxicity.

In some embodiments, the method further includes identifying an instance of toxicity in the audio stream and replacing the instance of toxicity in the audio stream with a noise or silence before transmitting the audio stream to the recipient device. In some embodiments, the method further includes identifying silence or a pause between words in the audio stream, the silence or the pause corresponding to a particular timestamp in the audio stream, where the time delay is introduced as a gap in the audio stream at the particular timestamp of the silence or the pause between words. In some embodiments, the method further includes updating the speech analysis score based on identifying the instance of toxicity in the audio stream. In some embodiments, the method further includes receiving text from a text channel associated with the sender device, wherein the text channel is separate from the audio stream and generating a text score that indicates a toxicity rating for the text, where the input to the trained machine-learning model further includes the text score. In some embodiments, the input to the trained machine-learning model further includes a toxicity history of the first user, a speaker history and metadata associated with the first user, and a listener history and metadata associated with a second user associated with the recipient device. In some embodiments, the one or more voice emotion parameters include tone, pitch, and a vocal effort level that are determined based on one or more prior audio streams from the sender device. In some embodiments, the audio stream is provided with a visual signal, and the method further includes synchronizing the visual signal to the audio stream by introduction of a same time delay in the visual signal as the time delay of the audio stream. In some embodiments, the audio stream is part of a video stream and the method further includes analyzing the audio stream to identify an instance of toxicity, responsive to identifying the instance of toxicity, detecting a portion of the video stream that depicts an offensive gesture, wherein the offensive gesture occurs within a predetermined time period of the instance of toxicity, and responsive to detecting the offensive gesture, modifying at least the portion of the video stream by one or more of blurring the portion or replacing the portion with pixels that match a background region. In some embodiments, the audio stream is part of a video stream and the method further includes performing motion detection on the video stream to detect an offensive gesture and responsive to detecting the offensive action, modifying at least the portion of the video stream by one or more of blurring the portion or replacing the portion with pixels that match a background region. In some embodiments, if the level of toxicity is below a minimum threshold, the time delay is zero seconds.

According to one aspect, a device includes a processor and a memory coupled to the processor, with instructions stored thereon that, when executed by the processor, cause the processor to perform operations comprising: receiving an audio stream from a sender device, providing, as input to a trained machine-learning model, the audio stream and a speech analysis score, information about one or more voice emotion parameters, and one or more voice emotion scores for a first user associated with the sender device, where the trained machine-learning model is iteratively applied to the audio stream and where each iteration corresponds to a respective portion of the audio stream, generating as output, with the trained machine-learning model, a level of toxicity in the audio stream, and transmitting the audio stream to a recipient device, where the transmitting is performed to introduce a time delay in the audio stream based on the level of toxicity.

In some embodiments, the operations further include identifying an instance of toxicity in the audio stream and replacing the instance of toxicity in the audio stream with a noise or silence before transmitting the audio stream to the recipient device. In some embodiments, the operations further include identifying silence or a pause between words in the audio stream, the silence or the pause corresponding to a particular timestamp in the audio stream, where the time delay is introduced as a gap in the audio stream at the particular timestamp of the silence or the pause between words. In some embodiments, the operations further include updating the speech analysis score based on identifying the instance of toxicity in the audio stream.

According to one aspect, non-transitory computer-readable medium with instructions stored thereon that, when executed by one or more computers, cause the one or more computers to perform operations, the operations comprising: receiving an audio stream from a sender device, providing, as input to a trained machine-learning model, the audio stream and a speech analysis score, information about one or more voice emotion parameters, and one or more voice emotion scores for a first user associated with the sender device, where the trained machine-learning model is iteratively applied to the audio stream and where each iteration corresponds to a respective portion of the audio stream, generating as output, with the trained machine-learning model, a level of toxicity in the audio stream, and transmitting the audio stream to a recipient device, where the transmitting is performed to introduce a time delay in the audio stream based on the level of toxicity.

In some embodiments, the operations further include identifying an instance of toxicity in the audio stream and replacing the instance of toxicity in the audio stream with a noise or silence before transmitting the audio stream to the recipient device. In some embodiments, the operations further include identifying silence or a pause between words in the audio stream, the silence or the pause corresponding to a particular timestamp in the audio stream, where the time delay is introduced as a gap in the audio stream at the particular timestamp of the silence or the pause between words. In some embodiments, the operations further include updating the speech analysis score based on identifying the instance of toxicity in the audio stream. In some embodiments, the operations further include receiving text from a text channel associated with the sender device, wherein the text channel is separate from the audio stream and generating a text score that indicates a toxicity rating for the text, where the input to the trained machine-learning model further includes the text score.

One way to prevent toxicity in an audio stream is to buffer the audio stream, identify instances of toxicity before the audio stream is transmitted from a sender device to a receiver device, and remove the instances of toxicity from the audio stream. However, moderating the audio stream introduces delay into the audio stream of multiple seconds. An audio delay greater than 50 ms creates an unnatural delay that interferes with conversations and anything more than a 250 ms delay causes conversations to break down.

The application advantageously describes a metaverse engine and/or metaverse application that provides a way to identify instances of toxicity while selectively inserting gaps or pauses in the audio stream in order to perform moderation without a perceptible delay.

DETAILED DESCRIPTION

Network Environment 100

Figure 1:
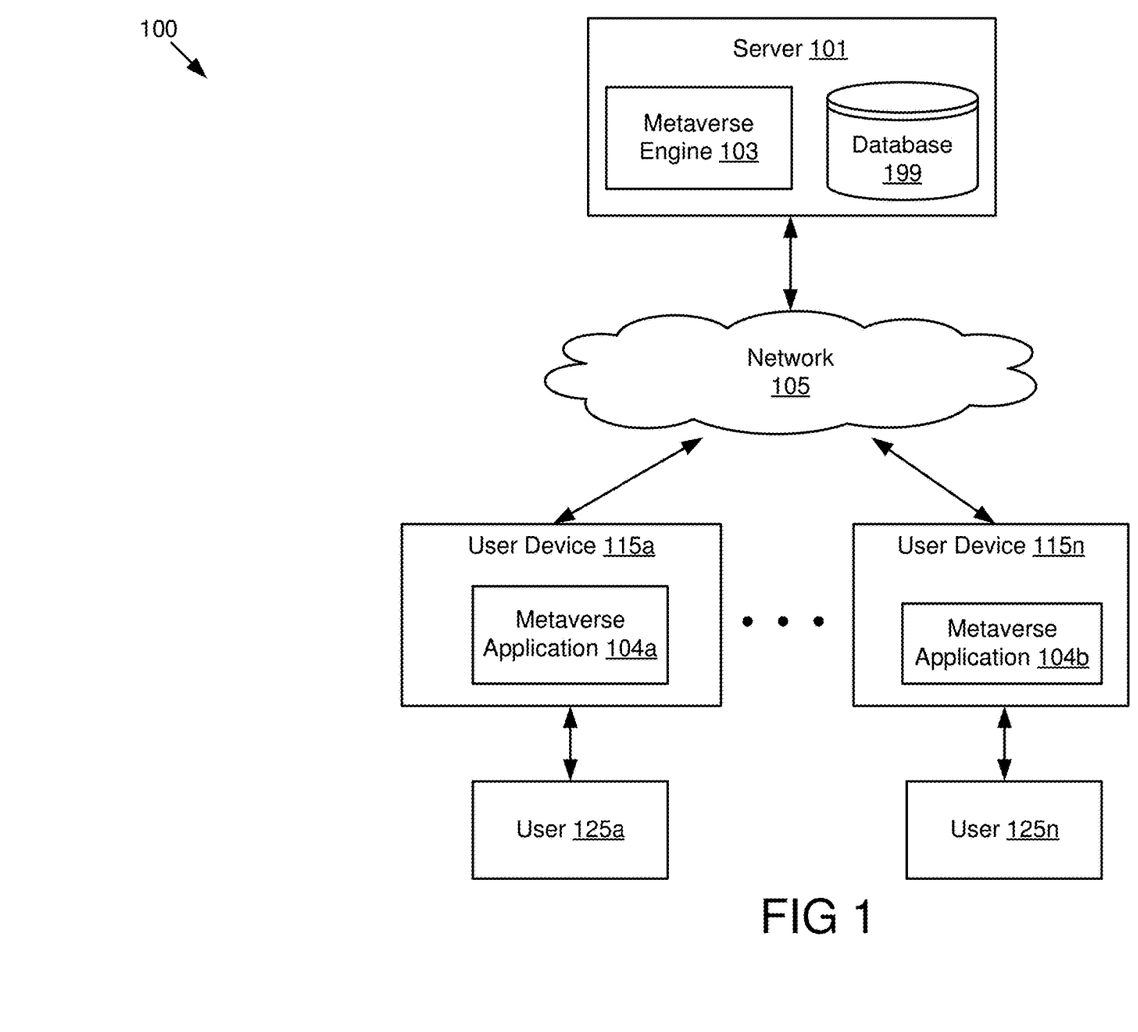
FIG. 1 is a block diagram of an example network environment to identify instances of toxicity in communications, according to some embodiments described herein.

FIG. 1 illustrates a block diagram of an example environment 100 to identify instances of toxicity in communications. In some embodiments, the environment 100 includes a server 101, user devices 115a . . . n, and a network 105. Users 125a . . . n may be associated with the respective user devices 115a . . . n. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number. In some embodiments, the environment 100 may include other servers or devices not shown in FIG. 1. For example, the server 101 may be multiple servers 101.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the user devices 115. The server 101 may include a metaverse engine 103 and a database 199.

In some embodiments, the metaverse engine 103 includes code and routines operable to receive communications between two or more users in a virtual metaverse, for example, at a same location in the metaverse, within a same metaverse experience, or between friends within a metaverse application. The users interact within the metaverse across different demographics (e.g., different ages, regions, languages, etc.).

In some embodiments, the metaverse engine 103 receives an audio stream from a user device 115a that is intended for a user device 115n. The metaverse engine 103 provides, as input to a trained machine-learning model, the audio stream and a speech analysis score, information about one or more voice emotion parameters, and one or more voice emotion scores for the user 115a associated with the user device 115a. The trained machine-learning model is iteratively applied to a respective portion of the audio stream, such as a few seconds of the audio stream as it is received.

The metaverse engine 103 generates as output, with the trained machine-learning model, a level of toxicity in the audio stream. The metaverse engine 103 transmits the audio stream to one or more other user devices 115n, where the transmitting is performed to introduce a time delay in the audio stream based on the level of toxicity. In some embodiments, the metaverse engine 103 uses the time delay to identify an instance of toxicity and replaces the instance of toxicity with a noise or silence before transmitting the audio stream to the one or more other user devices 115n.

In some embodiments, the metaverse engine 103 is implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the metaverse engine 103, such as training data sets for the trained machine-learning model, a history and metadata associated with each user 125, etc.

The user device 115 may be a computing device that includes a memory, a hardware processor, and a camera. For example, the user device 115 may include a mobile device, a tablet computer, a mobile telephone, a wearable device, a head-mounted display, a mobile email device, a portable game player, a portable music player, a reader device, or another electronic device capable of accessing a network 105 and capturing images with a camera.

User device 115a includes metaverse application 104a and user device 115n includes metaverse application 104b. In some embodiments, the user device 115a is a sender device and user device 115n is a receiver device. In some embodiments, the user 125a generates a communication, such as an audio stream or a video stream, using the metaverse application 104a on the sender device and the communication is transmitted to metaverse engine 103. Once the communication has been approved for transmission, the metaverse engine 103 transmits the communication to the metaverse application 104b on the receiver device for the user 125n to access.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the server 101 and the user devices 115, in practice one or more networks 105 may be coupled to these entities.

Computing Device Example 200

Figure 2:
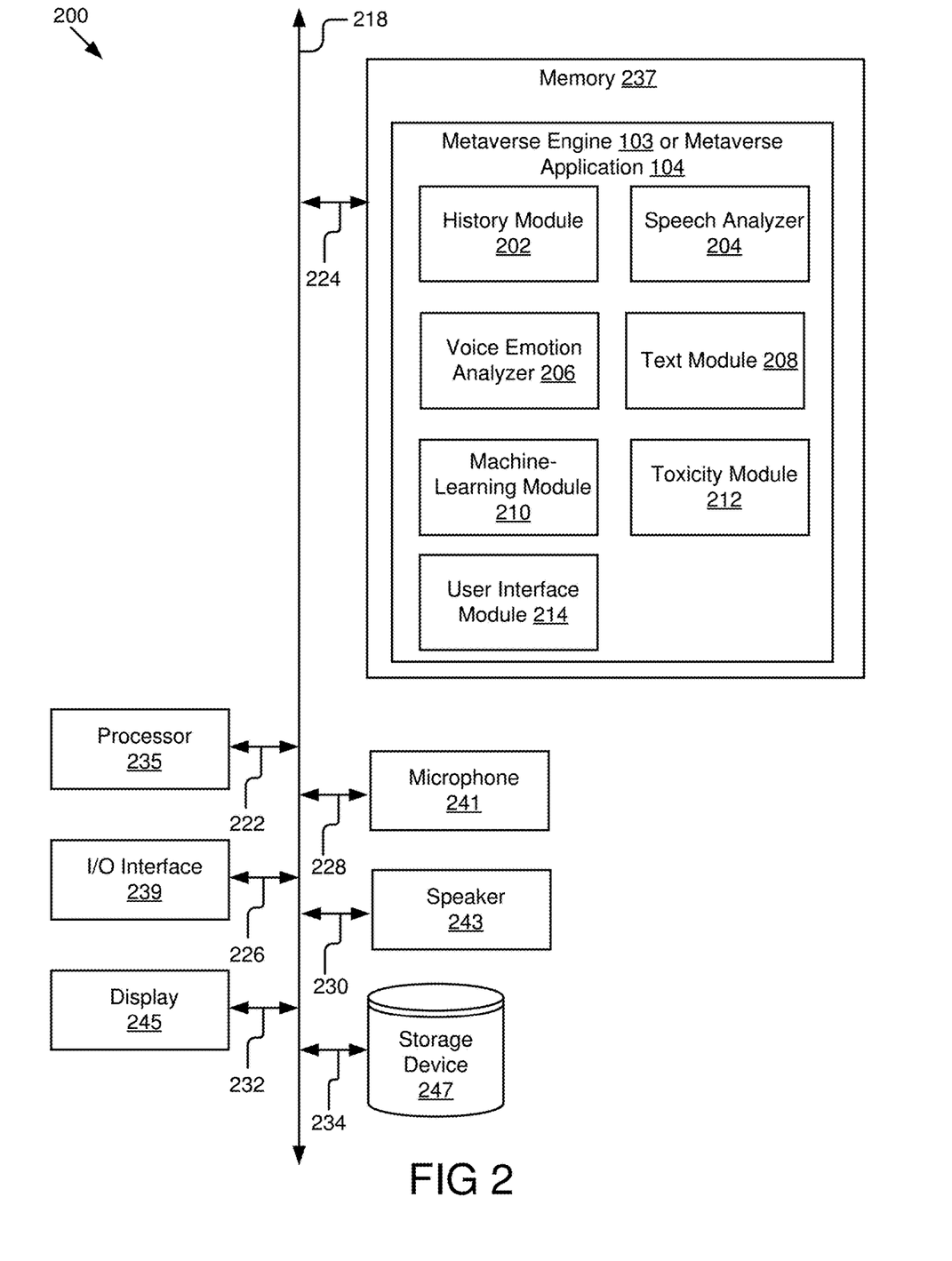
FIG. 2 is a block diagram of an example computing device to identify instances of toxicity in communications, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server 101. In some embodiments, the computing device 200 is the user device 115.

In some embodiments, computing device 200 includes a processor 235, a memory 237, an Input/Output (I/O) interface 239, a microphone 241, a speaker 243, a display 245, and a storage device 247. Depending on whether the computing device 200 is the server 101 or the user device 115, some components of the computing device 200 may not be present. For example, in instances where the computing device 200 is the server 101, the computing device may not include the microphone 241 and the speaker 243. In some embodiments, the computing device 200 includes additional components not illustrated in FIG. 2.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, and the storage device 247 may be coupled to the bus 218 via signal line 234.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse engine 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the server 101 and deliver the data to the metaverse engine 103 and components of the metaverse engine 103, such as the machine-learning module 210. In some embodiments, the I/O interface 239 can connect to interface devices such as input devices (keyboard, pointing device, touchscreen, microphone 241, sensors, etc.) and/or output devices (display devices, speaker 243, monitors, etc.).

Some examples of interfaced devices that can connect to I/O interface 239 can include a display 245 that can be used to display content, e.g., images, video, and/or a user interface of an output application as described herein, and to receive touch (or gesture) input from a user. Display 245 can include any suitable display device such as a liquid crystal display (LCD), light emitting diode (LED), or plasma display screen, cathode ray tube (CRT), television, monitor, touchscreen, three-dimensional display screen, or other visual display device.

The microphone 241 includes hardware for detecting audio spoken by a person. The microphone 241 may transmit the audio to the metaverse engine 103 via the I/O interface 239.

The speaker 243 includes hardware for generating audio for playback. For example, the speaker 243 receives instructions from the metaverse engine 103 to generate audio from another user after an audio stream was determined to not include instances of toxicity. The speaker 233 converts the instructions to audio and generates the audio for the user.

The storage device 247 stores data related to the metaverse engine 103. For example, the storage device 247 may store training data sets for the trained machine-learning model, a history and metadata associated with each user 125, etc. In embodiments where the computing device 200 is the server 101, the storage device 247 is the same as the database 199 in FIG. 1.

Example Metaverse Engine 103 or Metaverse Application 104

FIG. 2 illustrates a computing device 200 that executes an example metaverse engine 103 or metaverse application 104 that includes a history module 202, a speech analyzer 204, a voice emotion analyzer 206, a text module 208, a machine-learning module 210, a toxicity module 212, and a user interface module 214. Although the modules are illustrated as being part of the same metaverse engine 103 or metaverse application 104, persons of ordinary skill in the art will recognize that the modules may be implemented by computing devices 200. For example, the text module 208 may be part of a user device 115 that provides analysis of text communications before the text communications are sent to the metaverse engine 103 that is part of the server 101 in order to reduce the computational requirements of the server 101.

The history module 202 generates historical information and metadata about a user that participates in communications. In some embodiments, the history module 202 includes a set of instructions executable by the processor 235 to generate the historical information and the metadata. In some embodiments, the history module 202 is stored in the memory 237 of the computing device 200 and can be accessible and executable by the processor 235.

In some embodiments, after obtaining user permission, the history module 202 stores information about each communication session in the metaverse associated with a user and metadata associated with a user. The communication session may include audio streams, video streams, text communications, etc. After obtaining user permission, the history module 202 may store information about instances of toxicity associated with the user. For example, the history module 202 may identify when a user participated in instances of toxicity, what toxic behavior they performed (e.g., spoke a swear word, made an offensive action, bullied another user, threatened another user, etc.), identify a particular user that was targeted by the instance of toxicity, etc. In all cases where information about a user is stored, the history module 202 has obtained permission from the user, the user was made aware that the user can delete the information, and the information is stored securely and in compliance with applicable regulations. Further details are discussed below with reference to the user interface module 214.

In some embodiments, after obtaining user permission, the history module 202 may store information about the context for instances of toxicity, such as particular experiences. For example, a user may use a lot of curse words when playing violent shooter games but may not exhibit toxic behavior in non-violent role-playing games. The history module 202 may receive information about the instances of toxicity from other modules, such as the speech analyzer 204 and the toxicity module 212.

In some embodiments, after obtaining user permission, the history module 202 stores a listener history and metadata about a user's reaction to another user directing instance of toxicity towards them. For example, the history module 202 may update the listening history and metadata to indicate whether a user is insensitive to slurs, whether the user responds to abusive language with equally abusive language, whether the user reports a user in response to viewing an offensive action, etc. In another example, the history module 202 may track how many times a particular user has been blocked and whether the particular user is participating in an event where another user that blocked the particular user is also present. In some embodiments, the history module 202 generates a sensitivity score that reflects a user's sensitivity to instances of toxicity on a scale (e.g., 3 out of 10, 0.9 out of 1, etc.).

In some embodiments, after obtaining user permission, the history module 202 stores metadata associated with a user. For example, the metadata may include the region where the user lives, other demographic information (sex, gender, age, race, preferred pronouns, orientation, etc.), one or more internet protocol (IP) addresses associated with a user, one or more languages spoken by the user, etc. In some embodiments, the history module 202 may characterize the user's reactions in conjunction with the metadata. For example, the history module 202 may identify that the user is generally not sensitive to instances of toxicity in the metaverse, unless the user is called a slur that coincides with the user's religious affiliation, gender, race, etc.

The history module 202 may provide the historical information and metadata to the machine-learning module 210 as input to the trained machine-learning model. The history module 202 may also provide the historical information and metadata to other modules to provide context that affects how instances of toxicity are calculated. For example, the speech analyzer 204 receives the historical information and metadata because the speech analyzer 204 uses different rules for identifying instances of toxicity among users that are 13-16, 16-18, or over 18 years old.

In some embodiments, the speech analyzer 204 analyzes speech during a communication session. In some embodiments, the speech analyzer 204 includes a set of instructions executable by the processor 235 to analyze the speech during the communication session. In some embodiments, the speech analyzer 204 is stored in the memory 237 of the computing device 200 and can be accessible and executable by the processor 235.

The speech analyzer 204 receives an audio stream from a sender device. Because speech analysis may take several seconds, the speech analyzer 204 performs continuous analysis of speech in an audio stream. The analysis may be retroactive in that the speech analyzer 204 performs the analysis after the audio stream has already been transmitted to the recipient device or the analysis may occur each time an instance of toxicity is identified, regardless of whether the audio stream has been transmitted to the recipient device.

In some embodiments, the speech analyzer 204 includes a machine-learning model that is trained to predict various attributes of the audio stream, such as vocal effort, speaking style, language, spoken activity, etc.

The speech analyzer 204 may perform automated speech recognition (ASR), such as speech-to-text translation and compare the translated text to a list of toxic words to identify instances of toxicity in the audio stream. The speech analyzer 204 may generate a speech analysis score for a user associated with the sender device. For example, the speech analyzer 204 may generate the speech analysis score based on identifying the instances of toxicity associated with the audio stream.

In some embodiments, the speech analyzer 204 generates the speech analysis score based on demographics for a particular user. For example, the speech analyzer 204 applies a different rubric for what constitutes instances of toxicity based on whether the user is 13-16, 16-18, over 18 (or 12-15, 15-18, over 18, etc.), based on the user's location, based on whether the audio stream is being transmitted to users with different demographic information (e.g., the audio stream may be identified as including instances of toxicity when it is transmitted to a 13 year old user), or based on the type of game (e.g., a shooter game vs. a puzzle game).

In some embodiments, the speech analyzer 204 performs speech-to-text translation based on one or more languages spoken by the user. For example, the aquatic mammal "seal" in English is called "phoque" in French, which is not to be confused with an instance of toxicity, i.e., the obscenity "fuck" in English. In some embodiments, the identification of the one or more languages spoken by the user is received as part of the metadata determined by the history module 202.

In some embodiments, the speech analyzer 204 provides the speech analysis, such as a speech analysis score, periodically to the machine-learning module 210 as input to the trained machine-learning model. The speech analysis score may be associated with a timestamp so that the speech analysis score is aligned with a position in the audio stream. In some embodiments, the speech analyzer 204 transmits the speech analysis score to the machine-learning module 210 each time the speech analyzer 204 identifies an instance of toxicity in the audio stream and updates the speech analysis score to reflect the identified instance of toxicity.

The voice emotion analyzer 206 analyzes emotion in an audio stream. In some embodiments, the voice emotion analyzer 206 includes a set of instructions executable by the processor 235 to analyze emotion in the audio stream. In some embodiments, the voice emotion analyzer 206 is stored in the memory 237 of the computing device 200 and can be accessible and executable by the processor 235.

In some embodiments, the voice emotion analyzer 206 identifies different speakers in an audio stream and associates the different speakers with corresponding audio identifiers. The voice emotion analyzer 206 analyzes multiple voice parameters, such as one or more of a tone, a pitch, and a vocal effort level of each user in an audio stream. In some embodiments, the voice emotion analyzer 206 analyzes the tone by determining a positivity and an energy of the user's voice. For example, the voice emotion analyzer 206 detects if a user sounds excited, annoyed, neutral, sad, etc. In some embodiments, the voice emotion analyzer 206 determines an emotional state of the speaker based on an emotion quadrant. The emotion quadrant contains four states: neural, happy, angry, and sad. The voice emotion analyzer 206 may use a transformer-based technique for detection of emotion, such as using wav2vec2.0 as part of the front end.

In some embodiments, the voice emotion analyzer 206 analyzes the pitch in a range from 60 Hertz (Hz) to 2k Hz. In some embodiments, the voice emotion analyzer 206 establishes a base frequency of sound and determines a range of pitch that occurs during the audio stream.

In some embodiments, the voice emotion analyzer 206 analyzes the vocal effort level by determining a level of noise and comparing the level to predetermined descriptions of vocal effort. For example, the voice emotion analyzer 206 may determine that a person whispering creates vocal effort of 20-30 decibels (dB), a person speaking softly creates vocal effort of 30-55 dB, a person speaking at an average level creates a vocal effort of 55-65 dB, a person speaking loudly or yelling creates a vocal effort of 65-80 dB, and a person screaming creates a vocal effort of 80-120 dB. In some embodiments, the voice emotion analyzer 206 also identifies whether the vocal effort level is increasing as a function of time, since this may be indicative of a conversation that is escalating into an argument where harassment could occur.

In some embodiments, the voice emotion analyzer 206 generates a voice emotion score for a user associated with the audio stream. In some embodiments, the voice emotion analyzer 206 generates a separate score for each of tone, pitch, and vocal effort level that are determined based on one or more prior audio streams from the sender device. In some embodiments, the voice emotion analyzer 206 generates a voice emotion score that is a combination of tone, pitch, and vocal effort. For example, it may not be clear that a user is angry unless there is a combination of an angry tone, a large variation in pitch, and a low vocal effort level because the user does not yell when she is angry.

The voice emotion analyzer 206 may analyze emotion in an audio stream regardless of whether the user has used voice modulation software. For example, where a user has selected voice modulation software to sound like a popular cartoon character, the voice emotion analyzer 206 detects that modulation is occurring and performs the emotion analysis regardless of the modulation.

The voice emotion analyzer 206 may generate the one or more voice emotion scores periodically and transmit information about the voice emotion parameters as well as the one or more voice emotion scores to the machine-learning module 210. For example, the voice emotion analyzer 206 transmits information about the voice emotion parameters and the one or more voice emotion scores to the machine-learning module 210 each time the speech analyzer 204 identifies an instance of toxicity in the audio stream and updates the speech analysis scores to reflect the identified instance of toxicity. In another example, the voice emotion analyzer 206 transmits information about the voice emotion parameters and the one or more speech analysis scores each time there is a change in a voice emotion parameter, such as when a change in tone, pitch, or vocal effort level changes or when a change in tone, pitch, or vocal effort level exceeds one or more predetermined thresholds, such as when a user goes from a vocal effort level associated with regular speech to a vocal effort level associated with yelling.

In some embodiments, the voice emotion analyzer 206 may be stored on the sender device and perform a quick analysis of the voice emotion. For example, the sender device may include a voice emotion analyzer 206 that is 60% accurate for detecting tone. The voice emotion analyzer 206 on the sender device may transmit the information to the voice emotion analyzer 206 on the server 101, which performs a more detailed analysis of the voice emotion.

The text module 208 analyzes text from a text channel. In some embodiments, the text module 208 includes a set of instructions executable by the processor 235 to analyze the text. In some embodiments, the text module 208 is stored in the memory 237 of the computing device 200 and can be accessible and executable by the processor 235.

In some embodiments, a user may participate both in an audio stream and use a separate text channel to send text messages. For example, during a video call a user may be giving a presentation and also add additional information to a chat box associated with the video call. In another example, the user may participate in a game with an audio stream while sending direct text messages to a particular user through the game software. It can be helpful to analyze both the audio stream and the text messages because some users may be polite on an audio stream while directing abuse at particular members during the game using direct messaging.

In some embodiments, the text module 208 compares the text to a list of toxic words and identifies instances of toxicity in the text. The text module 208 may generate a text score based on the text messages that indicates a toxicity rating for the text. The text module 208 may generate the text score periodically and transmit the text score to the machine-learning module 210. In some embodiments, the text module 208 transmits the text score each time an instance of toxicity in the text is identified and, as a result, the text module 208 updates the text score.

In some embodiments, the text module 208 removes instances of toxicity from the text before transmitting the text to a recipient device. The text module 208 may simply remove the instances of toxicity, such as a first user threatening another user. Or the text module 208 may include a warning and an explanation about why the instance of toxicity was removed from the text.

In some embodiments, the text module 208 is stored on sender devices as part of the metaverse application 104a and the text is analyzed on the sender device to save computational resources for the server 101. The text module 208 on the sender device may send the text score to the metaverse engine 103 as input for the machine-learning module 210.

The machine-learning module 210 trains a machine-learning model (or multiple models) to output a level of toxicity in an audio stream. In some embodiments, the machine-learning module 210 includes a set of instructions executable by the processor 235 to train a machine-learning model to output the level of toxicity in the audio stream. In some embodiments, the machine-learning module 210 is stored in the memory 237 of the computing device 200 and can be accessible and executable by the processor 235.

In some embodiments, the machine-learning module 210 obtains a training dataset with audio streams that are manually labeled and paired with the output from one or more of the history module 202, the speech analyzer 204, the voice emotion analyzer 206, and the text module 208. In some embodiments, the manual labels include instances of toxicity in the audio streams and also meta information, such as language, emotional state, vocal effort, etc. For example, the training dataset may include an audio stream that is paired with output from the history module 202 that includes one or more of a toxicity history of a first user (i.e., a speaker), speaker history and metadata associated with the first user, and a listener history and metadata associated with a second user; output from the speech analyzer 204 that includes speech analysis scores for the first user that are transmitted periodically; output from the voice emotion analyzer 206 that includes speech analysis scores for the first user that are transmitted periodically and, in some embodiments, include separate speech analysis scores for tone, pitch, and vocal effort level; and output from the text module 208 that includes a text score.

In some embodiments, the training dataset further includes automatically labeled audio streams that were pre-processed for toxicity detection offline. The labels may indicate timestamps within the audio streams where instances of toxicity occurred.

In some embodiments, the training dataset further includes synthesized audio streams that are translated from speech-to-text where the synthesized audio streams include a large corpus of toxic and non-toxic speech. The synthesized audio streams may be labeled as including toxic and non-toxic speech and may include timestamps to detail where instances of toxicity occur.

In some embodiments, the training dataset further includes audio streams that are augmented with different parameters to aid in training the machine-learning model to output a level of toxicity in an audio stream in different situations. For example, the training dataset may be augmented with audio streams that include varying pitch of the speakers in the audio streams, noise, codec, echo, background distractors (e.g., traffic, nature sounds, people speaking indistinctly, etc.), music, and playback speeds.

The machine-learning module 210 trains a machine-learning model using the training dataset in a supervised learning fashion. The training dataset includes examples of audio streams with no toxic content and audio streams with one or more instances of toxicity, which enables the machine-learning module 210 to train the machine-learning model to classify input audio streams as including toxic or non-toxic activities, using the distinctions between toxic and non-toxic activities as labels during a supervised learning process.

In some embodiments, training data used for the machine-learning model includes audio streams collected with user permission for training purposes and labeled by human reviewers. For example, human reviewers listen to audio streams in the training data and identify whether each audio stream includes an instance of toxicity and if so, timestamps locations within the audio stream where the instance of toxicity occurs. The human-generated data is referred to as groundtruth labels. Such training data is then used to train the model, e.g., the model under training generates labels for each audio stream in the training data which is compared to the groundtruth labels and a feedback function based on the comparison is used to update one or more model parameters.

In some embodiments, the training data used for the machine-learning model also includes video streams. The training dataset may be labelled to include examples of video streams with no offensive actions and video streams with one or more offensive actions, which enables the machine-learning module 210 to train the machine-learning model to classify input video streams as including offensive actions or no offensive actions, using the distinctions between offensive and non-offensive actions as labels during a supervised learning process. For example, the training dataset with offensive actions may include a set of actions that correspond to offensive actions, such as lips moving to form curse words, arms moving to form motions associated with curse words for a threshold time period, etc. and motions that are precursors to offensive actions, such as arms starting to move in a particular way that could result in offensive actions. The video streams may include videos of users or videos of avatars of users.

In some embodiments, the machine-learning module 210 is a deep neural network. Types of deep neural networks include convolutional neural networks, deep belief networks, stacked autoencoders, generative adversarial networks, variational autoencoders, flow models, recurrent neural networks, and attention bases models. A deep neural network uses multiple layers to progressively extract higher-level features from the raw input where the input to the layers are different types of features extracted from other modules and the outputs are a determination of whether to perform moderation or not.

The machine-learning module 210 may generate layers that identify increasingly more detailed features and patterns within the speech for the audio stream where the output of one layer serves as input to a subsequently more detailed layer until a final output is a level of toxicity in the audio stream. One example of different layers in the deep neural network may include token embeddings, segment embeddings, and positional embeddings.

In some embodiments, the machine-learning module 210 trains the machine-learning model using a backpropagation algorithm. A backpropagation algorithm modifies internal weights of input signals (e.g., at each node/layer of a multi-layer neural network) based on feedback which may be a function of output labels (e.g., "this portion of the audio stream has level 1 toxicity") produced by the model under training with groundtruth labels included in the training data (e.g., "this portion of the audio stream has level 2 toxicity"). Such adjustment of weights can improve the accuracy of the model under training.

After the machine-learning module 210 trains the machine-learning model, the trained machine-learning model receives an input of a speech analysis score for a first user associated with a sender device from the speech analyzer 204, information about one or more voice emotion parameters and one or more voice emotion scores for the first user from the voice emotion analyzer 206, and the audio stream from the sender device. The information about the one or more voice emotion parameters may include information about tone, pitch, and vocal effort level of users in the audio stream.

In some embodiments, the machine-learning module 210 also receives a toxicity history of the first user, speaker history and metadata associated with the first user, and a listener history and metadata associated with a second user associated with a recipient device from the history module 202. The metadata may be utilized in identifying whether a speaker is likely to behave in violation of community guidelines. For example, a user that gets banned may create a new user profile, but the metadata includes indicators that it is the same user, such as the IP address and the demographic information. In some embodiments, the machine-learning module 210 also receives a text score from the text module 208 that indicates a toxicity rating for the text. In some embodiments, the trained machine-learning model receives the speech analysis score, the information about the one or more voice emotion parameters, and the one or more voice emotion scores periodically. In some embodiments, the trained machine-learning model receives the audio stream continually and the trained machine-learning model is iteratively applied to the audio stream, where each iteration corresponds to a respective portion of the audio stream. For example, the trained machine-learning model may be applied to the audio stream every one second, every two seconds, every 0.5 seconds, etc.

The trained machine-learning model generates as output a level of toxicity in the audio stream. The level of toxicity in the audio stream is a reflection of how toxic the audio stream currently is and a prediction that the audio stream may get more toxic.

In some embodiments, the machine-learning module 210 transmits the level of toxicity in the audio stream to the toxicity module 212. The machine-learning module 210 may provide the level of toxicity each time it is generated by the trained machine-learning model.

The toxicity module 212 introduces a time delay of the audio stream based on the level of toxicity and analyzes the audio stream for an instance of toxicity. In some embodiments, the toxicity module 212 includes a set of instructions executable by the processor 235 to introduces the time dela and analyze the audio stream for the instance of toxicity. In some embodiments, the user interface module 214 is stored in the memory 237 of the computing device 200 and can be accessible and executable by the processor 235.

In some embodiments, the toxicity module 212 receives a level of toxicity for the audio stream from the machine-learning module 210. The level of toxicity may correspond to a time delay of the transmission of the audio stream to the receiver device. For example, a level of 0 may indicate that there is no likelihood of toxicity in the audio stream and the audio stream can be transmitted without a time delay.

In some embodiments, the toxicity module 212 determines whether to introduce a time delay in transmitting the audio stream in order to have enough time to analyze the audio stream for instances of toxicity. For example, the time delay may be 0 to 5 seconds. In some embodiments, if the level of toxicity is below a minimum threshold, the time delay is zero seconds and the toxicity module 212 transmits the audio stream to the recipient device. In some embodiments, if the level of toxicity exceeds a minimum threshold, the toxicity module 212 determines an amount of delay to apply based on increasing levels of toxicity. In some embodiments, the toxicity module 212 also applies a more intense level of scrutiny when the level of toxicity indicates that the audio stream is more likely to be toxic. The higher delay in transmission is a negative feedback mechanism that may discourage toxic behavior even without additional moderation by slowing down interaction or preventing effective communication. In some embodiments, the level of toxicity may be so high that the toxicity module 212 mutes the user. For example, if the user uses expletives in every-other word, it might be easier to simply mute the audio stream until the user's tirade is complete.

In some embodiments, the toxicity module 212 performs a speech-to-text translation of the audio stream or receives a translation from one of the other modules. In some embodiments, the toxicity module 212 performs the speech-to-text translation after a speaker completes a sentence. In some embodiments, the toxicity module 212 identifies instances of toxicity in the audio stream without first converting the audio stream to text.

The toxicity module 212 identifies instances of toxicity in the audio stream. In some embodiments, the toxicity module 212 adjusts the time delay in transmission of the audio stream progressively to avoid creating a perceivable audio artifact and targets change during gaps between words or sentences. For example, the toxicity module 212 introduces a gap when there is silence or a pause to make the gap less noticeable. Pauses and silence are detectable in less than 100 ms so it takes less time for the toxicity module 212 to identify pauses and silence than to wait for a for a sentence to finish. In some embodiments, the toxicity module 212 tracks a timestamp of all audio signals/packets to aid in adding gaps in the right places and making the transition between speaking and silence more seamless.

In some embodiments, the toxicity module 212 replaces the instances of toxicity in the audio stream with noise or censors the instances of toxicity by replacing the instances of toxicity with silence.

In some embodiments, the audio stream is part of a visual signal. The visual signal may be an animation, such as an avatar animation or a physics animation, or the visual signal may be a video stream where the audio stream is part of the video stream. The visual signal is presented to one or more other users and the users all participate in a metaverse where representations of the users (e.g., their avatars) are in a same region of the metaverse such that each avatar can see the other avatar while the users are interacting with each other. In instances where the toxicity module 212 introduces a time delay in transmission of the audio, the toxicity module 212 synchronizes the time delay with the video signal so that the visual signal has the same time delay as the time delay of the audio stream.

Figure 3:
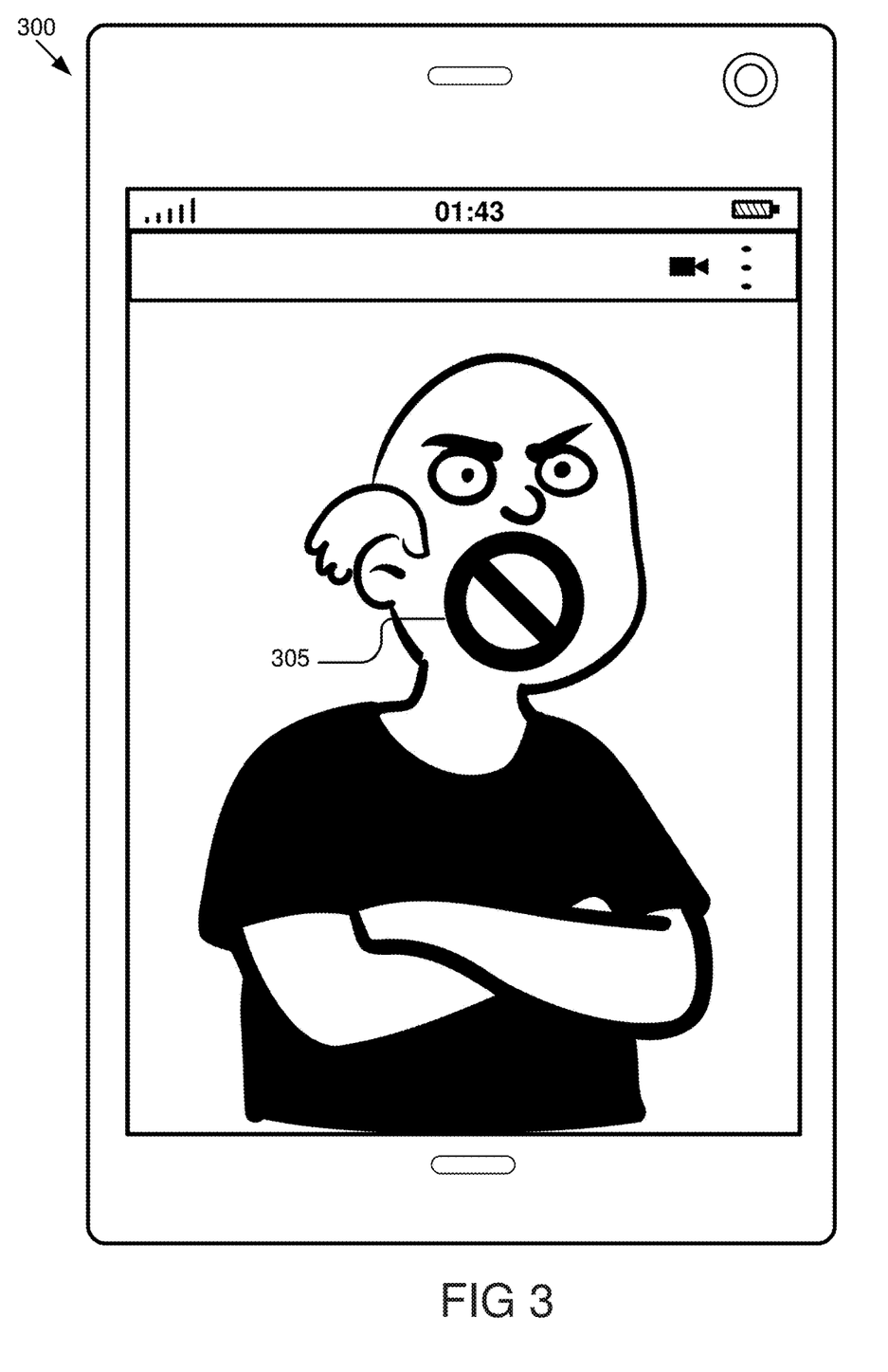
FIG. 3 is an example user interface of a video stream where an instance of toxicity is identified, according to some embodiments described herein.

In some embodiments, the toxicity module 212 analyzes a video stream for instances of toxicity. Responsive to the toxicity module 212 identifying an instance of toxicity in the audio stream, the toxicity module 212 may analyze the video stream for offensive actions that occur within a predetermined time period of the instance of toxicity. For example, turning to FIG. 3, an example user interface 300 of a video stream is illustrated where an instance of toxicity in the audio stream is identified by the toxicity module 212. The toxicity module 212 performs image recognition on the video stream of a user's avatar and identifies a location within the video stream where the speaker's mouth moves to form the words that correspond to the instance of toxicity in the audio stream. The toxicity module 212 instructs the user interface module 214 to overlay a graphic 305 on the speaker's mouth while the speaker is performing the offensive action. Because the graphic 305 draws attention to the offensive action, other mitigating actions are possible such as adding blur to the mouth or even replacing the mouth with pixels that match the background.

In some embodiments, the toxicity module 212 performs motion detection and/or object detection on the video to identify an offensive action. Responsive to identifying the offensive action, the toxicity module 212 blurs the offensive action in the video stream or replaces the offensive action with pixels that match the background. In some embodiments, the toxicity module 212 may analyze a user's avatar while performing motion detection and/or object detection to determine if the avatar looks agitated and use the avatar as a signal that the user might perform an offensive action.

Figure 4:
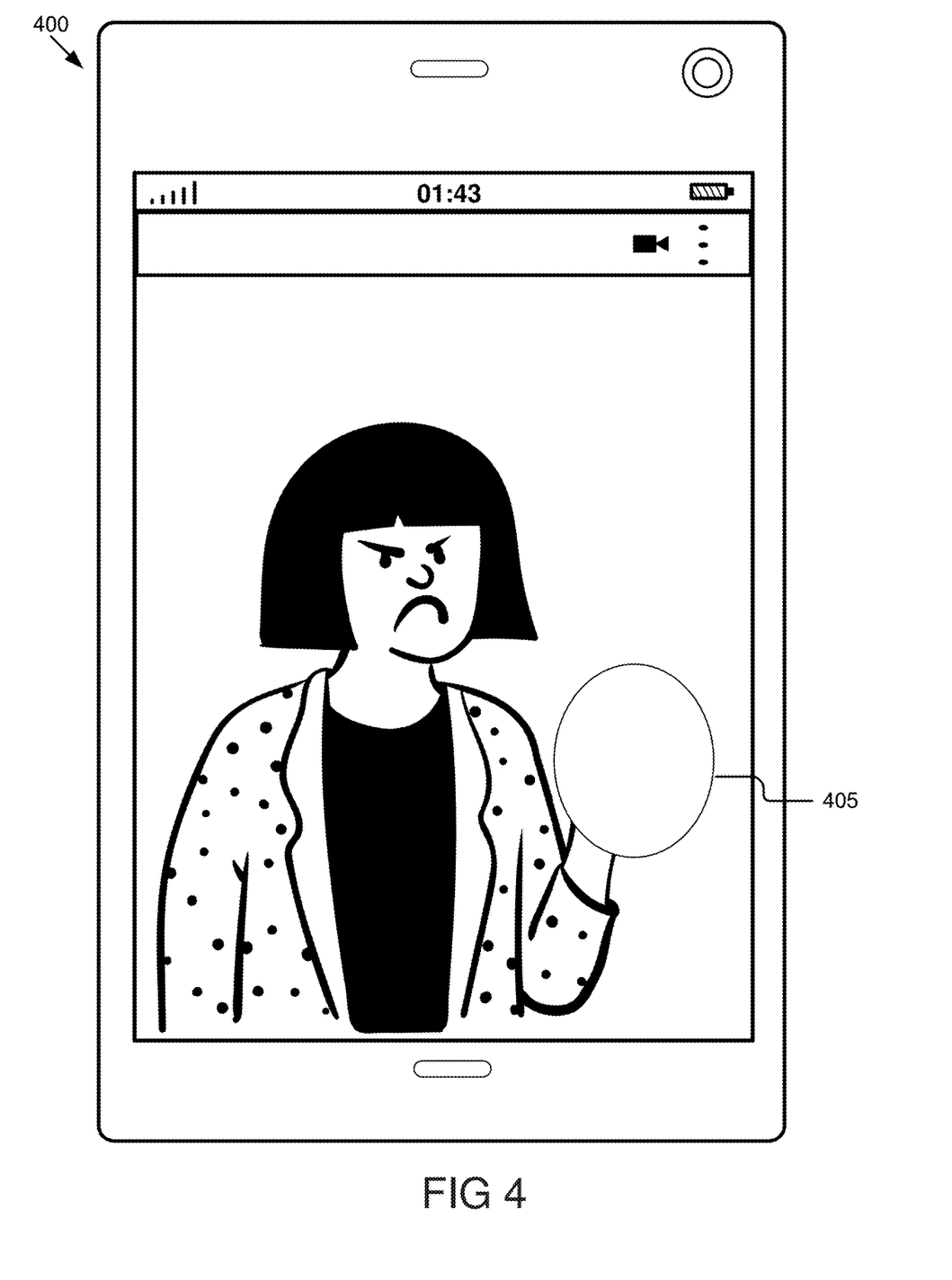
FIG. 4 is an example user interface of a video stream where an offensive action is identified, according to some embodiments described herein.

Turning to FIG. 4, another example user interface 400 of a video stream is illustrated where an offensive action is identified. In this example, the toxicity module 212 determines that the user is about to form an offensive action and that the user looks angry. The toxicity module 212 generates a mask 405 that replaces pixels associated with the hand with pixels from the background so that the offensive action is not visible.

The user interface module 214 generates a user interface. In some embodiments, the user interface module 214 includes a set of instructions executable by the processor 235 to generate the user interface. In some embodiments, the user interface module 214 is stored in the memory 237 of the computing device 200 and can be accessible and executable by the processor 235.

The user interface module 214 generates a user interface for users 125 associated with user devices 115. The user interface may be used to initiate audio communication with other users, participate in games in the metaverse, send text to the other users, initiate video communication with other users, etc. In some embodiments, the user interface includes options for adding user preferences, such as an ability to block other users 125.

In some embodiments, before a user participates in the metaverse, the user interface module 214 generates a user interface that includes information about how the user's information is collected, stored, and analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

In some embodiments, the user interface module 214 provides a user interface that explains to the user that the metaverse engine 103 automatically detects instances of toxicity and may store audio or video of the instances of toxicity in association with the user's account.

Example Methods

Figure 5:
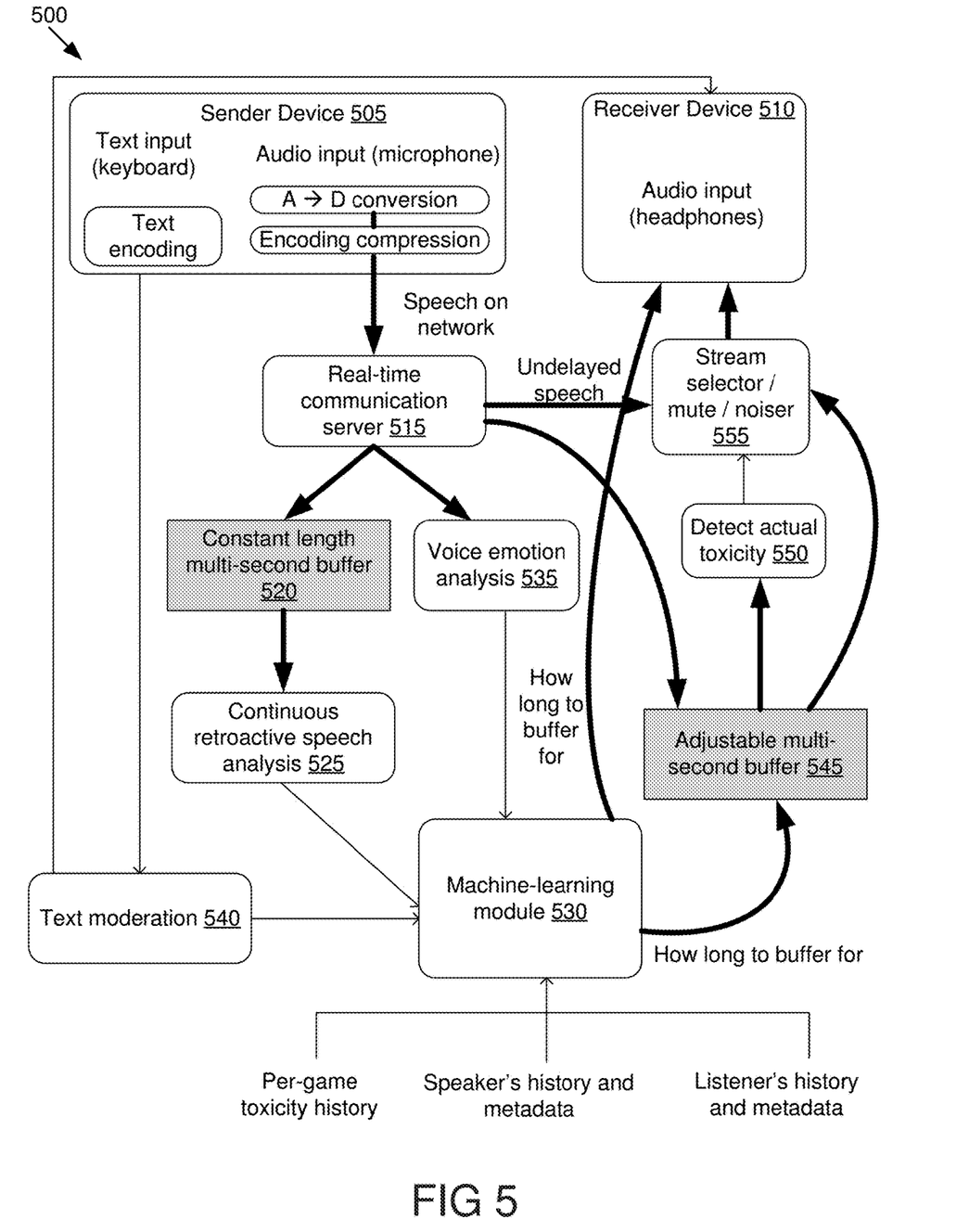
FIG. 5 is an example flow diagram to identify instances of toxicity in communications, according to some embodiments described herein.

FIG. 5 is an example flow diagram 500 to identify instances of toxicity in communications. In the flow diagram 500, a thick line represents data flow that includes the audio stream and a thin line represents data flow of information.

The flow diagram 500 includes audio communication and text communication from a sender device 505 to a receiver device 510. The sender device 505 receives audio input via a microphone and performs an analog to digital conversion of an audio stream, compresses the audio stream, and transmits the audio stream to a real-time server 515. The real-time server 515 transmits the audio stream to a constant length multi-second buffer 520 that transmits the audio stream to a module that performs continuous retroactive speech analysis 525. The continuous retroactive speech analysis 525 is not performed in real-time in order to have sufficient time to improve the accuracy of the analysis. The module performing the continuous retroactive speech analysis 525 transmits the speech analysis to the machine-learning module 530. The real-time server 515 transmits the audio stream to the stream selected/mute/noisier module 555 to be forwarded to the receiver device 510 in instances where the machine-learning module 530 determines that the audio stream does not need to be delayed. The real-time server 515 transmits the audio stream to the adjustable multi-second buffer 545 if the machine-learning module 530 determines that the audio stream needs to be delayed.

The audio stream is also transmitted to a module that performs voice emotion analysis 535. The voice emotion analysis is transmitted as input to the machine-learning module 530.

The sender device 505 also receives text input via a keyboard. The sender device 505 performs text encoding and transmits the text to a module that performs text moderation 540. The module that performs text moderation 540 transmits the text to the receiver device 510 and as input to the machine-learning module 530.

The machine-learning module 530 also receives as input a per-game toxicity history, speaker's history and metadata, and listener's history and metadata.

The machine-learning module 530 predicts the likelihood of toxicity occurring soon and determines how long to buffer the audio for. If there is no likelihood of toxicity occurring, there is no delay of the audio stream and the machine-learning module 530 transmits the audio stream directly to the receiver device 510. If there is a likelihood of toxicity occurring, the machine-learning module 530 transmits the audio stream to the adjustable multi-second buffer 545. The adjustable multi-second buffer 545 transmits the audio stream to a module that detects actual toxicity 550. The module that detects actual toxicity 550 transmits instances of toxicity to the module that determines whether to select a stream, mute the stream, or add noise to the stream 555. The stream selector/mute/noisier module 555 transmits the audio stream to the receiver device 510.

Figure 6:
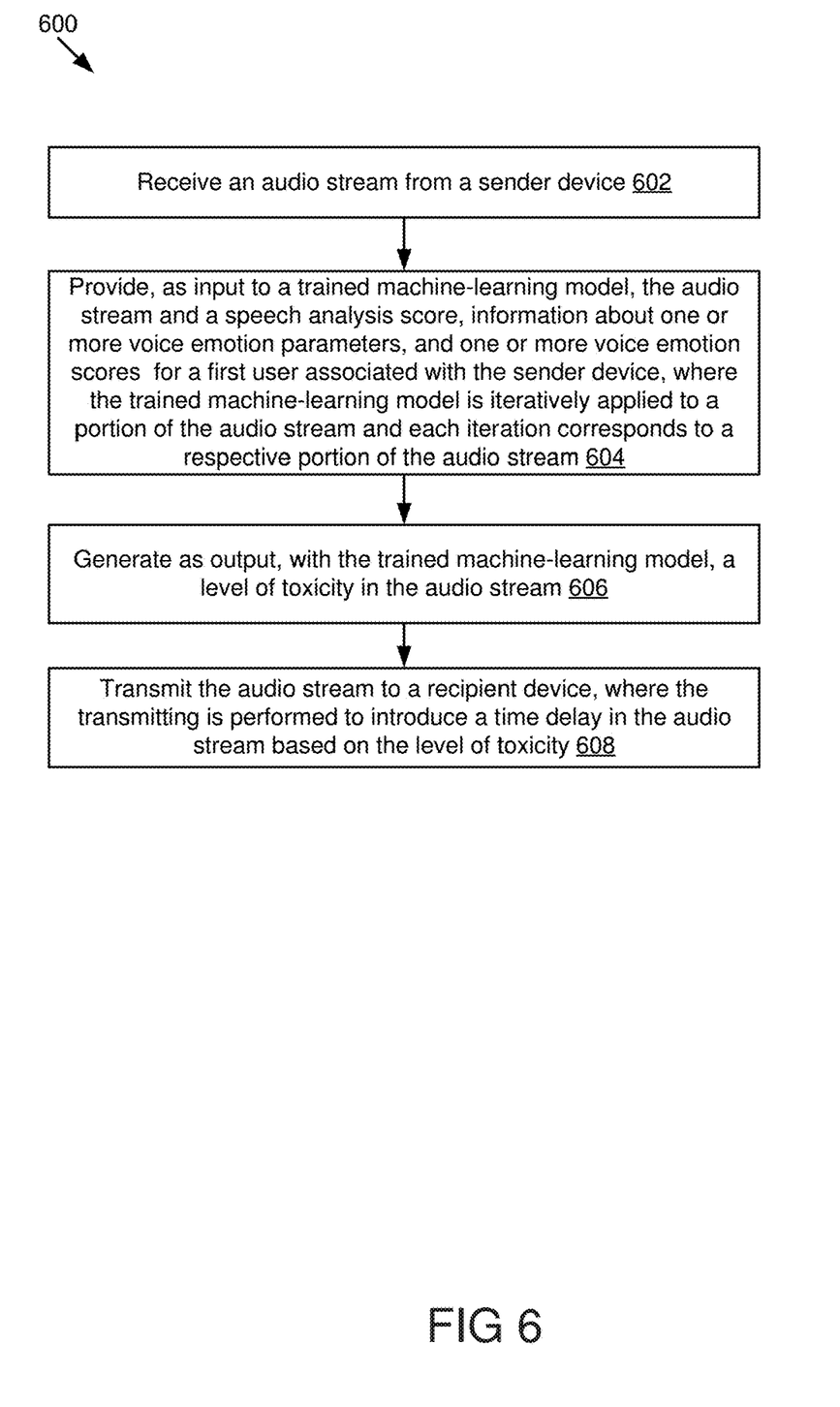
FIG. 6 is another example flow diagram to identify instances of toxicity in communications, according to some embodiments described herein.

FIG. 6 is another example flow diagram 600 to identify instances of toxicity in communications, according to some embodiments described herein. In some embodiments, the metaverse engine 103 is stored on the server 101. In some embodiments, the metaverse engine 103 is stored on the user device 115. In some embodiments, the metaverse engine 103 is stored in part on the server 101 and in part on the user device 115.

The method 600 may begin at block 602. At block 602, an audio stream from a sender device is received. Block 602 may be followed by block 604.

At block 604, input to a trained machine-learning model is provided that includes the audio stream and a speech analysis score, information about one or more voice emotion parameters, and one or more voice emotion scores for a first user associated with the sender device. The trained machine-learning model is iteratively applied to a portion of the audio stream, where each iteration corresponds to a respective portion of the audio stream. Block 604 may be followed by block 606.

At block 606, the trained machine-learning model generates as output a level of toxicity in the audio stream. Block 606 may be followed by block 608.

At block 608, the audio stream is transmitted to a recipient device. The transmitting is performed to introduce a time delay in the audio stream based on the level of toxicity.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for stoning electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to determine whether to introduce latency into an audio stream from a particular speaker, the method comprising:
   receiving an audio stream from a sender device;
   providing, as input to a trained machine-learning model, the audio stream and a speech analysis score, information about one or more voice emotion parameters, and one or more voice emotion scores for a first user associated with the sender device, wherein the trained machine-learning model is iteratively applied to the audio stream and wherein each iteration corresponds to a respective portion of the audio stream;
   generating as output, with the trained machine-learning model, a level of toxicity in the audio stream;
   identifying silence or a pause between words in the audio stream, the silence or the pause corresponding to a particular timestamp in the audio stream; and
   transmitting the audio stream to a recipient device, wherein the transmitting is performed to introduce a time delay in the audio stream based on the level of toxicity and wherein the time delay is introduced as a gap in the audio stream at the particular timestamp of the silence or the pause between words.

2. The method of claim 1, further comprising:
   identifying an instance of toxicity in the audio stream; and
   replacing the instance of toxicity in the audio stream with a noise or silence before transmitting the audio stream to the recipient device.

3. The method of claim 1, wherein the audio stream is part of a metaverse.

4. The method of claim 2, further comprising:
   updating the speech analysis score based on identifying the instance of toxicity in the audio stream.

5. The method of claim 1, further comprising:
   receiving text from a text channel associated with the sender device, wherein the text channel is separate from the audio stream; and
   generating a text score that indicates a toxicity rating for the text;
   wherein the input to the trained machine-learning model further includes the text score.

6. The method of claim 1, wherein the input to the trained machine-learning model further includes a toxicity history of the first user, a speaker history and metadata associated with the first user, and a listener history and metadata associated with a second user associated with the recipient device.

7. The method of claim 1, wherein the one or more voice emotion parameters include tone, pitch, and a vocal effort level that are determined based on one or more prior audio streams from the sender device.

8. The method of claim 1, wherein the audio stream is provided with a visual signal, and the method further comprises synchronizing the visual signal to the audio stream by introduction of a same time delay in the visual signal as the time delay of the audio stream.

9. The method of claim 1, wherein the audio stream is part of a video stream, and the method further comprises:
   analyzing the audio stream to identify an instance of toxicity;
   responsive to identifying the instance of toxicity, detecting a portion of the video stream that depicts an offensive action, wherein the offensive action occurs within a predetermined time period of the instance of toxicity; and
   responsive to detecting the offensive action, modifying at least the portion of the video stream by one or more of blurring the portion or replacing the portion with pixels that match a background region.

10. The method of claim 1, wherein the audio stream is part of a video stream, and the method further comprises:
    performing motion detection on the video stream to detect an offensive gesture; and
    responsive to detecting the offensive gesture, modifying at least the portion of the video stream by one or more of blurring the portion or replacing the portion with pixels that match a background region.

11. The method of claim 1, wherein if the level of toxicity is below a minimum threshold, the time delay is zero seconds.

12. A device comprising:
    a processor; and
    a memory coupled to the processor, with instructions stored thereon that, when executed by the processor, cause the processor to perform operations comprising:
    receiving an audio stream from a sender device;
    providing, as input to a trained machine-learning model, the audio stream and a speech analysis score, information about one or more voice emotion parameters, and one or more voice emotion scores for a first user associated with the sender device, wherein the trained machine-learning model is iteratively applied to the audio stream and wherein each iteration corresponds to a respective portion of the audio stream;
    generating as output, with the trained machine-learning model, a level of toxicity in the audio stream;
    identifying silence or a pause between words in the audio stream, the silence or the pause corresponding to a particular timestamp in the audio stream; and
    transmitting the audio stream to a recipient device, wherein the transmitting is performed to introduce a time delay in the audio stream based on the level of toxicity and wherein the time delay is introduced as a gap in the audio stream at the particular timestamp of the silence or the pause between words.

13. The device of claim 12, wherein the operations further comprise:
    identifying an instance of toxicity in the audio stream; and
    replacing the instance of toxicity in the audio stream with a noise or silence before transmitting the audio stream to the recipient device.

14. The device of claim 12, wherein the audio stream is part of a metaverse.

15. The device of claim 12, wherein the operations further comprise:
    updating the speech analysis score based on identifying the instance of toxicity in the audio stream.

16. A non-transitory computer-readable medium with instructions stored thereon that, when executed by one or more computers, cause the one or more computers to perform operations, the operations comprising:
    receiving an audio stream from a sender device;
    providing, as input to a trained machine-learning model, the audio stream and a speech analysis score, information about one or more voice emotion parameters, and one or more voice emotion scores for a first user associated with the sender device, wherein the trained machine-learning model is iteratively applied to the audio stream and wherein each iteration corresponds to a respective portion of the audio stream;

generating as output, with the trained machine-learning model, a level of toxicity in the audio stream;

identifying silence or a pause between words in the audio stream, the silence or the pause corresponding to a particular timestamp in the audio stream; and transmitting the audio stream to a recipient device, wherein the transmitting is performed to introduce a time delay in the audio stream based on the level of toxicity and wherein the time delay is introduced as a gap in the audio stream at the particular timestamp of the silence or the pause between words.

17. The computer-readable medium of claim 16, wherein the operations further comprise:

identifying an instance of toxicity in the audio stream; and replacing the instance of toxicity in the audio stream with a noise or silence before transmitting the audio stream to the recipient device.

18. The computer-readable medium of claim 16, wherein the audio stream is part of a metaverse.

19. The computer-readable medium of claim 16, wherein the operations further comprise:

updating the speech analysis score based on identifying the instance of toxicity in the audio stream.

20. The computer-readable medium of claim 16, wherein the operations further comprise:

receiving text from a text channel associated with the sender device, wherein the text channel is separate from the audio stream; and generating a text score that indicates a toxicity rating for the text;

wherein the input to the trained machine-learning model further includes the text score.

* * * * *